United States Patent
Moronkeji et al.

(10) Patent No.: US 11,078,787 B2
(45) Date of Patent: Aug. 3, 2021

(54) ESTIMATING PROPERTIES OF A SUBTERRANEAN FORMATION

(71) Applicant: Baker Hughes, a GE Company, LLC, Houston, TX (US)

(72) Inventors: Dee Adedotun Moronkeji, Houston, TX (US); Otto Fanini, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 398 days.

(21) Appl. No.: 15/882,742

(22) Filed: Jan. 29, 2018

(65) Prior Publication Data

US 2019/0234204 A1   Aug. 1, 2019

(51) Int. Cl.
| | |
|---|---|
| *E21B 49/06* | (2006.01) |
| *E21B 47/14* | (2006.01) |
| *E21B 49/00* | (2006.01) |
| *G01V 1/44* | (2006.01) |
| *G01V 1/143* | (2006.01) |
| *G01V 1/28* | (2006.01) |

(52) U.S. Cl.
CPC .............. *E21B 49/06* (2013.01); *E21B 47/14* (2013.01); *E21B 49/00* (2013.01); *G01V 1/143* (2013.01); *G01V 1/282* (2013.01); *G01V 1/44* (2013.01); *G01V 2210/6222* (2013.01); *G01V 2210/6242* (2013.01)

(58) Field of Classification Search
CPC .......... E21B 10/02; E21B 25/00; E21B 25/16; E21B 49/00; E21B 49/02; E21B 49/06
See application file for complete search history.

(56) References Cited

U.S. PATENT DOCUMENTS

| | | | |
|---|---|---|---|
| 4,641,520 | A | 2/1987 | Mao |
| 4,832,148 | A | 5/1989 | Becker et al. |
| 4,855,963 | A | 8/1989 | Winbow et al. |
| 4,995,008 | A | 2/1991 | Hornbostel et al. |
| 5,501,285 | A | 3/1996 | Lamine et al. |
| 6,137,747 | A | 10/2000 | Shah et al. |
| 6,456,064 | B1 | 9/2002 | Dore et al. |
| 6,718,266 | B1 | 4/2004 | Sinha et al. |
| 6,739,423 | B2 | 5/2004 | Tashiro et al. |

(Continued)

OTHER PUBLICATIONS

International Search Report and Written Opinion dated Apr. 9, 2019 for International Patent Application No. PCT/US2019/066199.

*Primary Examiner* — Tara Schimpf
(74) *Attorney, Agent, or Firm* — Hogan Lovells US LLP

(57) ABSTRACT

Extracting a core sample from within a wellbore is optimized based on information extracted from acoustic signals that are generated downhole. The acoustic signals provide an indication of the formation being cored, which is used to obtain or adjust designated coring operating parameters for accomplishing an efficient and effective coring procedure. Coring operating parameters that are adjusted include weight on bit and bit rotational speed. Optimizing coring operating parameters reduces wear on the bit and produces samples with less fractures. Generating acoustic signals is done by the operation of coring itself, or contacting the formation with a coring bit. Contacting includes impacting the coring bit radially against the wellbore's sidewall, or moving the bit laterally after coring operations have initiated.

17 Claims, 4 Drawing Sheets

(56) References Cited

U.S. PATENT DOCUMENTS

| | | |
|---|---|---|
| 6,791,899 B2 | 9/2004 | Blanch et al. |
| 6,909,666 B2 | 6/2005 | Dubinsky et al. |
| 7,036,363 B2 | 5/2006 | Yogeswaren |
| 7,626,886 B2 | 12/2009 | Dubinsky et al. |
| 8,576,659 B2 | 11/2013 | Egerev et al. |
| 9,140,816 B2 | 9/2015 | Market et al. |
| 9,223,039 B2 | 12/2015 | Vu et al. |
| 2008/0251292 A1 | 10/2008 | Desmette et al. |
| 2009/0159335 A1 | 6/2009 | Cravatte |
| 2011/0094801 A1 | 4/2011 | Buchanan et al. |
| 2011/0240364 A1* | 10/2011 | Catoi ............ E21B 47/01 175/44 |
| 2012/0318579 A1* | 12/2012 | Yang ............ E21B 49/06 175/44 |
| 2016/0109603 A1 | 4/2016 | Jin et al. |
| 2017/0211381 A1* | 7/2017 | Chemali ......... E21B 47/0002 |
| 2019/0169986 A1* | 6/2019 | Storm, Jr. ......... E21B 45/00 |

* cited by examiner

ESTIMATING PROPERTIES OF A SUBTERRANEAN FORMATION

BACKGROUND OF THE INVENTION

1. Field of Invention

The present disclosure relates to estimating properties of rock disposed subterranean. More specifically, the present disclosure relates to estimating properties of rock disposed subterranean, and optimizing drilling operations based on the estimated properties.

2. Description of Prior Art

Drilling systems having earth boring drill bits are used in the oil and gas industry for creating wells drilled into hydrocarbon bearing substrata. Drilling systems typically include a drilling rig (not shown) and a drill string with a drill bit on its lower terminal end. Drilling rigs are outside of the wellbore, and mounted on the Earth's surface for land wells, and generally on one of a semisubmersible or floating rig when the wellbore is subsea. A drive system on the drilling rig, usually either a top drive or rotary table, rotate the drill string and drill bit as the drill bit is being urged against the subterranean formation.

Other types of types of excavating within a wellbore include gathering a sample of the subterranean formation, which is typically obtained from a sidewall of the wellbore being drilled, and which is usually cylindrically shaped. The samples are often referred to as cores, and the process of extracting them is referenced as coring. The step of coring often employs a coring tool having a side coring bit that is rotatable and can be urged radially outward from the coring tool. The coring bit is usually made up of a sleeve having a cutting surface on of its end that is projected outward from the tool. Thus sample cores can be gathered by rotating the coring bit while urging it against the sidewall, thereby cutting a sample away from the formation that is collected within the sleeve. The end of the sample adjacent the cutting surface breaks away from the rest of the formation so that the coring sleeve with sample inside can be drawn back into the coring tool.

Performance of the excavating tool (i.e. a drill bit or coring bit), is dependent on properties of the rock in the formation. Moreover, the rock properties can vary along the length of the wellbore, so that rock at one depth has different properties of rock at another depth. Certain drilling parameters, such as weight on bit or rate or bit rotation, are sometimes altered to accommodate for the perceived changes in the rock properties. Often though the rock properties are unknown, or partially known or understood with varying degrees of certainties (probability density functions associated to a range of property and parameter values) to the drilling operators during the step of drilling.

SUMMARY OF THE INVENTION

Disclosed herein is an example of a method of operations in a wellbore that include contacting a sidewall of the wellbore with a coring bit so that an acoustic signal is generated in a subterranean formation that circumscribes the wellbore, obtaining a characteristic of the acoustic signal, estimating a property of the subterranean formation being contacted by the coring bit based on the obtained characteristic of the acoustic signal, and operating the coring bit at a designated parameter based on the estimated property of the subterranean formation. In an alternative, the characteristic of the acoustic signal is a velocity of a shear wave of the acoustic signal and velocity of a compressional wave of the acoustic signal. In an alternative, the property of the subterranean rock formation is Young's modulus, Bulk modulus, Shear modulus, Poisson's ratio, and combinations thereof. Optionally, the designated parameter is a weight on bit or a rotation of the bit per minute. In one embodiment, contacting involves radially displacing the bit into impact with the sidewall of the wellbore, conducting coring operations with the bit by rotating the bit, reciprocating the bit in a plane that is substantially parallel with an spaced radially away from an axis of the wellbore. Reciprocating optionally takes place during a step of obtaining a core sample. Alternatively, the characteristic of the acoustic signal is obtained by recording the acoustic signal at a location spaced away from where the sidewall of the wellbore is contacted by the coring bit. In an example, the characteristic of the acoustic signal being obtained is a velocity of the acoustic signal, and wherein the acoustic signal is recorded by acoustic receivers that are spaced apart from one another a known distance and arranged sequentially along an expected path of the acoustic signal. In one embodiment, the step of contacting a sidewall of the wellbore with a coring bit includes projecting the coring bit radially from an axis of the wellbore into contact with the sidewall, wherein the characteristic of the acoustic signal is a velocity of the acoustic signal, wherein a range of values of a target energy being used per volume of rock drilled is selected based on the estimate of the property of the subterranean formation, and wherein the designated parameter is selected based on the target energy. In an alternate embodiment, the designated parameter is a first designated parameter, the method further including changing operation of the coring bit to operate at a second designated parameter in response to a detected change in a property of the subterranean formation being contacted by the coring bit.

Another example method of operations in a wellbore is disclosed herein and that includes generating an acoustic signal in a subterranean formation that circumscribes the wellbore, obtaining a characteristic of the acoustic signal, and excavating in the formation by operating a bit at a designated parameter that is based on the characteristic of the acoustic signal. The method optionally includes estimating a property of the subterranean formation being contacted by the coring bit based on the obtained characteristic of the acoustic signal. In one example, the characteristic of the acoustic signal are velocities of shear and compressional waves in the acoustic signal. Alternatively, excavating involves obtaining a core sample.

Also described herein is an example of a system for use in a wellbore which includes a coring bit that selectively engages a sidewall of the wellbore, an acoustic sensor spaced away from the coring bit, and that selectively senses acoustic signals generated by the coring bit engaging the sidewall and that propagate in a formation adjacent the sidewall, and a processor that is in communication with the acoustic sensor and that selectively estimates a property of the formation based on a characteristic of the sensed acoustic signal, the processor selectively operating the coring bit at a designated parameter based on the estimated property of the formation. The acoustic sensor alternately is an array of sensors, some of which are spaced apart from one another along an expected path of the acoustic signals in the formation rock so that a velocity of the acoustic signal is obtained. In one embodiment, the acoustic sensor is an array of sensors, some of which are spaced axially away from one another, and some of which are spaced laterally away from one another, so that velocities of acoustic signals traveling axially and azimuthally are obtained by the spaced apart sensors. An actuator is optionally included for moving the coring bit within a plane that is spaced radially away from an axis of the wellbore.

BRIEF DESCRIPTION OF DRAWINGS

Some of the features and benefits of the present invention having been stated, others will become apparent as the description proceeds when taken in conjunction with the accompanying drawings, in which.

Figure 1:
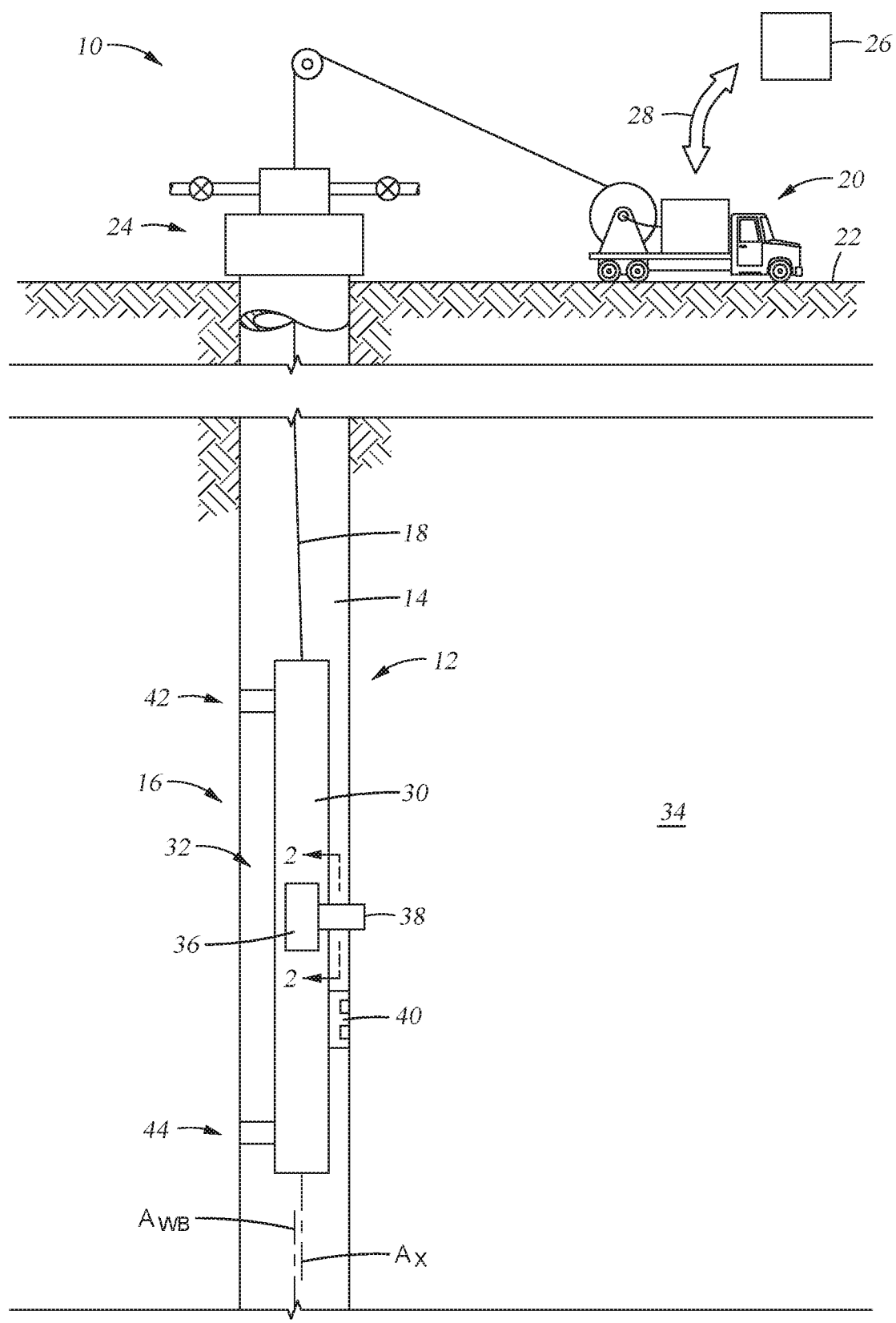
FIG. 1 is a side partial sectional view of an example of a downhole system having a tool in a wellbore.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

One example of a system 10 for performing operations downhole is shown in a side partial sectional view in FIG. 1, where the system 10 includes a downhole string 12 disposed in a wellbore 14. Included in the string 12 is a downhole tool 16 shown deployed in the wellbore 14 on a conveyance means 18. Example conveyance means include wireline, slick-line, cable, and coiled tubing. An end of conveyance means 18 opposite from its connection to downhole tool 16 connects to a surface truck 20 shown mounted on surface 22 and proximate an opening of wellbore 14. Deployment of the conveyance means 18 is optionally performed with a winch or reel (not shown) disposed within truck 20. Conveyance means 18 is threaded through a wellhead assembly 24 shown at the opening of wellbore 14, and which provides pressure control on wellbore 14. Optionally, a controller 26 is provided in communication with surface truck 20 via a communications means 28. Embodiments exist where controller 26 is disposed within or remote from surface truck 20. In one example, controller 26 includes or is made up of an information handling system ("IHS"), where the IHS includes a processor, memory accessible by the processor, nonvolatile storage area accessible by the processor, and logics for performing steps described herein. Examples of communication means 28 include electrically conducting members, such as wires, fiber optics, and wireless transmission.

A generally cylindrically shaped tool housing 30 provides an outer covering for downhole tool 16. In the example of the tool 16 of FIG. 1, a coring unit 32 is disposed within housing 30 and is used to selectively obtain a core sample (not shown) from formation 34. More specifically, coring unit 32 includes a coring unit housing 36 within housing 30 and a coring bit 38 which selectively extends radially outward from tool housing 30 and into contact with formation 34. In an alternative, coring bit 38 is a generally annular member with a cutting surface on an axial end, and with an axial bore circumscribed by the cutting tool and which receives the coring sample. Further included with the example of the downhole tool 16 of FIG. 1 is a transducer assembly 40 as shown is mounted on an outer surface of tool housing 30 and in physical contact with a sidewall of wellbore 14. In one alternative embodiment, transducer assembly 40 is retractable inside of tool housing 30 and into a recess (not shown) formed in tool housing 30. Optional push arm assemblies 42, 44 are illustrated deployed radially from tool housing 30 and into contact with a sidewall of wellbore 14. Push arm assemblies 42, 44 provide a radial urging force that maintains tool housing 30 against a side of wellbore 14 where a coring sample is being obtained by coring unit 32. When urged against sidewall of wellbore 14 as shown in FIG. 1, axis $A_x$ of downhole tool 16 is radially offset from axis $A_{WB}$ of wellbore 14.

Figure 2:
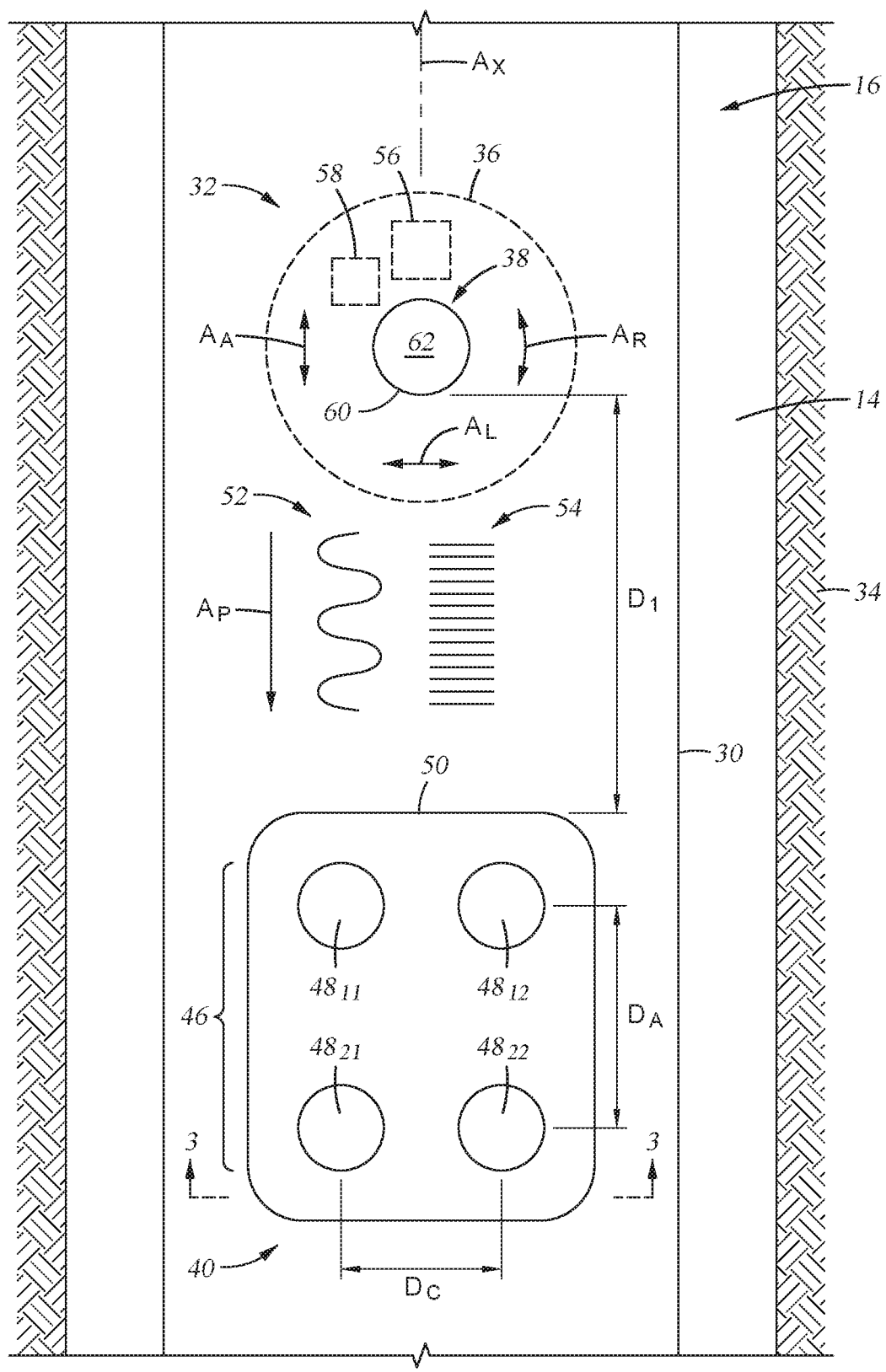
FIG. 2 is side partial sectional view of the downhole system of FIG. 1 taken along lines 2-2.

FIG. 2 shows in a side partial sectional view an example portion of downhole tool 16 and taken along lines 2-2 of FIG. 1. Here, the coring unit housing 36 is shown in a dashed outline and disposed axially away a distance $D_1$ from transducer assembly 40, but at substantially the same azimuthal location as the transducer assembly 40. Optionally, transducer assembly 40 is positioned at an azimuth which is angularly offset from coring unit housing 36. Example values for $D_1$ include a range of about equal to that of a diameter of coring bit 38, to about two times the diameter of the coring bit 38. In one alternative, upper and lower limits of the value of $D_1$ is any value within that range, optionally, specific values of $D_1$ is any value within that range. Further in the example of FIG. 2, the transducer assembly 40 includes a transducer array 46 shown including transducers $48_{11}$, $48_{12}$, $48_{21}$, and $48_{22}$ mounted on a generally planar pad 50. In an alternative, transducers $48_{11}$, $48_{12}$, $48_{21}$, and $48_{22}$ are piezo electric transducers which are sensitive to acoustic signals that propagate within or otherwise pass through formation 34.

Further in the example of FIG. 2, transducers $48_{11}$, $48_{12}$, $48_{21}$, and $48_{22}$ are strategically arranged on pad 50 so that transducers $48_{11}$ and $48_{12}$ are disposed at substantially the same axial location on pad 50; and thus the same axial distance from coring bit 38. Similarly, transducer $48_{21}$ and transducer $48_{22}$ are each at substantially the same axial location on pad 50 on a side of transducers $48_{11}$, $48_{12}$ distal from coring unit 32. Transducer $48_{21}$ and transducer $48_{22}$ are disposed a distance $D_A$ respectively from transducers $48_{11}$, $48_{12}$. Further, transducers $48_{11}$, $48_{21}$ are each spaced a circumferential distance $D_C$ from transducers $48_{12}$, $48_{22}$. Accordingly, acoustic signals generated by coring unit 32 and that propagate within formation 34, will arrive at and be sensed by transducers $48_{11}$, $48_{12}$ prior to arriving at transducers $48_{21}$, $48_{22}$. In an example, with a known or given distance $D_A$, and measuring the time when a particular acoustic signal is received by transducers $48_{11}$, $48_{12}$ and transducers $48_{21}$, $48_{22}$, a velocity of that particular acoustic signal is determinable by dividing the distance $D_A$ by the time difference of when the signal is received by transducers $48_{11}$, $48_{12}$ and when that same signal is received by transducers $48_{21}$, $48_{22}$. Schematic examples of a shear wave 52, and compressional wave 54 are depicted between the coring unit 32 and transducer assembly 40 and traveling in a direction defined by arrow $A_P$. It should be pointed out that the acoustic signals, such as shear wave 52, and compression wave 54, being received and monitored by transducers $48_{11}$, $48_{12}$, $48_{21}$, $48_{22}$ propagate within formation 34. In an alternative, the transducers $48_{11}$, $48_{12}$, $48_{21}$, $48_{22}$ are disposed a distance from coring bit 38 so that waves 52, 54 are organized; the determination of which is within the capabilities of those skilled in the art.

Also included with coring unit 32 is a motor 56 schematically represented which is used for providing a rotational force to coring bit 38. In the example of FIG. 2, coring bit rotates in the direction as illustrated by arrow $A_R$. Alternate embodiments exist wherein coring bit is moved laterally within a plane which is parallel with, but radially offset from axis $A_X$ of downhole tool 16. Arrow $A_L$ represents an example path of reciprocating movement of coring bit 38, and which is oriented in a direction substantially perpendicular to axis $A_X$. Arrow $A_A$ represents an example of reciprocating movement of coring bit 38 in another axial direction which is substantially along a path parallel with axis $A_X$. Alternatively, when moving along the paths illustrated by arrow $A_L$ or arrow $A_A$, coring bit 38 is oriented so that its axis is projecting radially outward from axis $A_X$ of tool body 30. An optional actuator 58 is schematically represented within FIG. 2 and which selectively couples with either coring bit 38, motor 56, or coring bit housing 36 to create the motion causing coring bit 38 to move along paths as illustrated by arrows $A_L$, $A_A$. Moreover, other embodiments exist wherein the reciprocating movement of coring bit 38 within the above-described plane is orthogonal with axis $A_X$, therefore, motion of bit 38 is not limited to the lateral or axial movement described in FIG. 2. Embodiments exist where motor 56 and actuator 58 operate concurrently, or operate separately from the coring/drilling operation to assess rock properties independently of a drilling and coring operation. In an example of concurrent operation, transducers $48_{11}$, $48_{12}$, $48_{21}$, $48_{22}$ additionally observe through acoustically induced signals the drilling/coring operation development and performance. Further shown in the example of FIG. 2 are cutting teeth 60 on an axial end of coring bit 38 and on a terminal edge of the sidewall of the coring bit 38 which contacts formation 34. The annular configuration of the coring bit 38 defines a cylindrical bore 62 within coring bit 38 and in which a coring sample (not shown) is received and retained until brought to surface 22 (FIG. 1).

In one example of operation, acoustic signals are formed within formation, such as by contacting a sidewall of wellbore 14 with sufficient force that the acoustic signals travel within the formation 14 and are received by transducers $48_{11}$, $48_{12}$, $48_{21}$, $48_{22}$. Knowing the time at which each of the respective transducers $48_{11}$, $48_{12}$, $48_{21}$, $48_{22}$ receive these signals and the distances between them, velocity of the particular acoustic signal is estimated. Based on this value of velocity, in one embodiment one or more of various elastic constants of the rock are estimated. Example elastic constants include Young's modulus, bulk modulus, shear modulus, and Poisson's ratio. The following are example equations of these elastic constants that are based on velocity of a sensed shear wave ($t_s$), velocity of a sensed compressional wave ($t_c$), and density of the subterranean formation ($\rho$). Example techniques for estimating formation density $\rho$ include inferring this value based on the velocity measurements, as well as from strain gage measurements obtained from a sidewall of the wellbore 14.

Young's Modulus $E=(\rho/t_s^2)((3t_s^2-4t_c^2)/(t_s^2-t_c^2))$
    $1.34\times10^{30}$    Equation 1

Bulk Modulus $K=\rho((3t_s^2-4t_c^2)/(t_s^2-t_c^2))1.34\times10^{30}$    Equation 2

Shear Modulus $\mu=(\rho/t_s^2)1.34\times10^{10}$    Equation 3

Poisson's ratio $\sigma=\frac{1}{2}(t_s^2-2t_c^2)/(t_s^2-t_c^2)$    Equation 4

In an example, an unconfined compressive strength ("UCS") of rock making up the formation is estimated based on the values obtained from Equations 1 through 4 above, bulk density data, and correlations. Relationships between mechanical specific energy ("MSE") and subterranean excavation are discussed in the following, and which are incorporated by reference herein in their entireties and for all purposes: (1) Teale, "The Concept of Specific Energy in Rock Drilling," Int. J. Rock Mech. Mining Sci. Vol. 2, pp 57-73 (1965); (2) Pessier, R. C., and Fear, M. J., "Quantifying Common Drilling Problems with Mechanical Specific Energy and a Bit-Specific Coefficient of Sliding Friction," paper IADC/SPE 24584, presented Oct. 4-7, 1992; (3) Waughman, R. J., Kenner, J. V., and Moore, R. A., "Real-Time Specific Energy Monitoring Reveals Drilling Inefficiency and Enhances the Understanding of When to Pull Worn PDC Bits," paper IADC/SPE 74520, presented Feb. 26-28, 2002; and (4) Dupriest, F. E., and Koederitz, W. L., "Maximizing Drill Rates with Real-Time Surveillance of Mechanical Specific Energy," paper IADC/SPE 92194, presented Feb. 23-25, 2005.

Still referring to FIG. 2, the strategic placement of each of the transducers $48_{11}$, $48_{12}$, $48_{21}$, $48_{22}$ in this illustrated example provides an ability to identify if the acoustic signal being sensed is a shear wave 52, or a compressional wave 54. In an embodiment, a compressional wave 54 propagates through the formation 34 at a velocity that is greater than a velocity of the shear wave 52. Compressional wave 54 optionally is formed by bit 38 excavating within formation 14, and is sensed by transducers $48_{11}$, $48_{12}$, $48_{21}$, $48_{22}$. In this example, transducers at the same axial location (i.e. transducers $48_{11}$, $48_{12}$ or transducers $48_{21}$, $48_{22}$) encounter the compressional wave 54 at substantially the same time. In an example where compressional wave 54 arrives at and is sensed by transducer $48_{11}$, and then at a later time the same compressional wave 54 arrives at and is sensed by transducer $48_{21}$, a value of a velocity of the compressional wave 54 is estimated by subtracting the time at which transducer $48_{11}$ receives the signal from the time at which transducer $48_{21}$ receives the signal, and then dividing that difference by distance $D_A$. Alternatives exist where signals received by the transducers $48_{11}$, $48_{12}$, $48_{21}$, $48_{22}$ are processed, such as by cross correlation, so that specific signals are identified. In an example, localized displacement in the formation 34 due to the shear wave 52 propagates in a generally circumferential direction around the wall of the wellbore 14, and is first detectable by a one of the transducers $48_{11}$, $48_{12}$, $48_{21}$, $48_{22}$ at the same axial location before being detectable by another one of the transducers $48_{11}$, $48_{12}$, $48_{21}$, $48_{22}$ at the same axial location. Thus, in an example shear wave 52 is detectable differentially by transducers $48_{11}$, $48_{12}$, and at a point in time later shear wave 52 is detectable differentially by transducers $48_{21}$ and $48_{22}$. Further in this example, a velocity of the shear wave 52 is estimated based on the time the shear wave 52 is detected by one of the transducers $48_{11}$, $48_{12}$, $48_{21}$, $48_{22}$ and distances between transducers $48_{11}$, $48_{12}$, and $48_{21}$, $48_{22}$.

Figure 3:
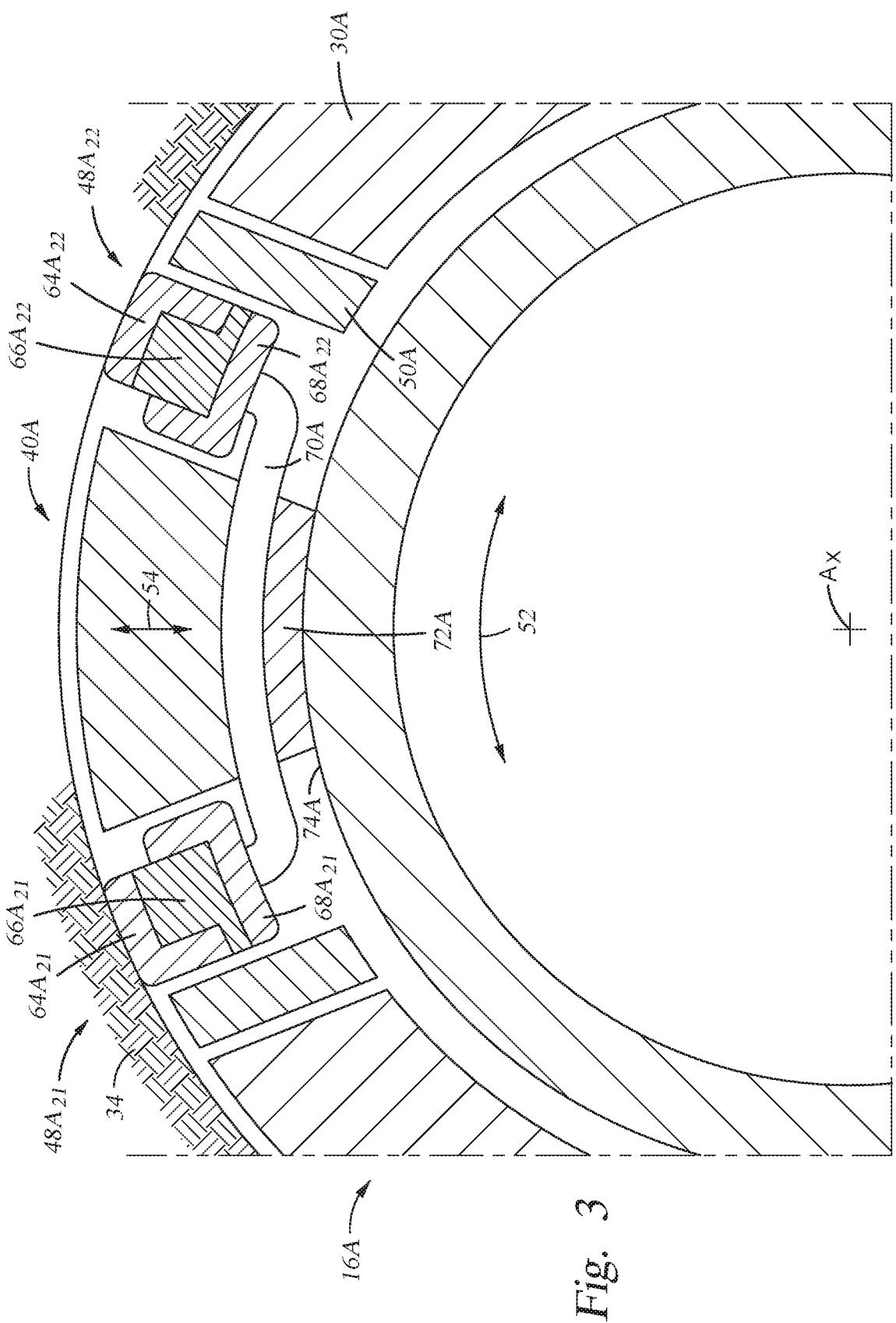
FIG. 3 is a schematic axial sectional view of an example of a transducer assembly of FIG. 2 and taken along lines 3-3.

An alternate example of transducer assembly 40A is shown in schematic form in FIG. 3, and which is taken along lines 3-3 in FIG. 2. Here transducers $48A_{21}$, $48A_{22}$ include caps $64A_{21}$, $64A_{22}$, that in an example are formed from a metal or other hard substance, and which cover piezoelectric elements $66A_{21}$, $66A_{22}$. Each piezoelectric element $66A_{21}$, $66A_{22}$ is illustrated as a cube like member, and where caps $64A_{21}$, $64A_{22}$ are disposed on surfaces of piezoelectric elements $66A_{21}$, $66A_{22}$ facing formation 34. In the example of FIG. 3, caps $64A_{21}$, $64A_{22}$ are in contact with formation 34 and coupled with piezoelectric elements $66A_{21}$, $66A_{22}$. Further in the example of FIG. 3, caps $64A_{21}$, $64A_{22}$ extend along lateral sides of piezoelectric elements $66A_{21}$, $66A_{22}$ that are distal from one another. Further illustrated in the example of FIG. 3 is that piezoelectric elements $66A_{21}$, $66A_{22}$ are set in base members $68A_{21}$, $68A_{22}$ that are depicted having an "L" shaped cross section with sidewalls that extend radially from an axis $A_X$ of tool 16A that on an inner radial end attach to sidewalls shown oriented transverse to axis $A_X$ and projecting in opposite directions from one another along a circumference of tool 16A. Base members $68A_{21}$, $68A_{22}$ couple to and support surfaces of the piezoelectric elements $66A_{21}$, $66A_{22}$ that are opposite from formation 34 and along lateral sides of piezoelectric elements $66A_{21}$, $66A_{22}$ that are facing one another. Base members $68A_{21}$, $68A_{22}$ are shown mounted on a "U" shaped cradle 70A; where cradle 70A includes an elongated midportion that extends circumferentially along a portion of pad 50A, and legs on opposing ends of the mid-portion that extend radially outward a distance less than that of a length of mid-portion. Base members $68A_{21}$, $68A_{22}$ are disposed on ends of the legs distal from mid-portion. A section of mid-portion is shown mounted to another piezoelectric element 72A which is attached to a support surface 74A disposed within housing 30A. Piezoelectric elements $66A_{21}$, $66A_{22}$, 72A include electroactive substances, and materials that are responsive to deformation, such as by emitting an electrical signal. Examples of these materials include piezoelectric substances, such as quartz, ammonium/potassium dihydrogen phosphate, lithium niobate, silicon selenite, germanium selenite, piezoelectric ceramics, combinations thereof, and the like. Further examples of these materials include electroactive polymers.

In one non-limiting example of operation, the configuration of the transducers $48A_{21}$, $48A_{22}$ of transducer assembly 40A are sensitive to shear waves 52 propagating in directions opposite from one another (i.e. clockwise for transducer $48A_{21}$ and counterclockwise for transducer $48A_{22}$), which for the purposes of discussion herein are referred to as sensitive directions. The inner or radially oriented walls of base members $68A_{21}$, $68A_{22}$ block movement of piezoelectric elements $66A_{21}$, $66A_{22}$ in response to shear waves 52 propagating in the sensitive directions, and thus generate a response signal having a larger magnitude than signals generated when subjected to shear waves 52 traveling in directions different from the sensitive directions.

Figure 4:
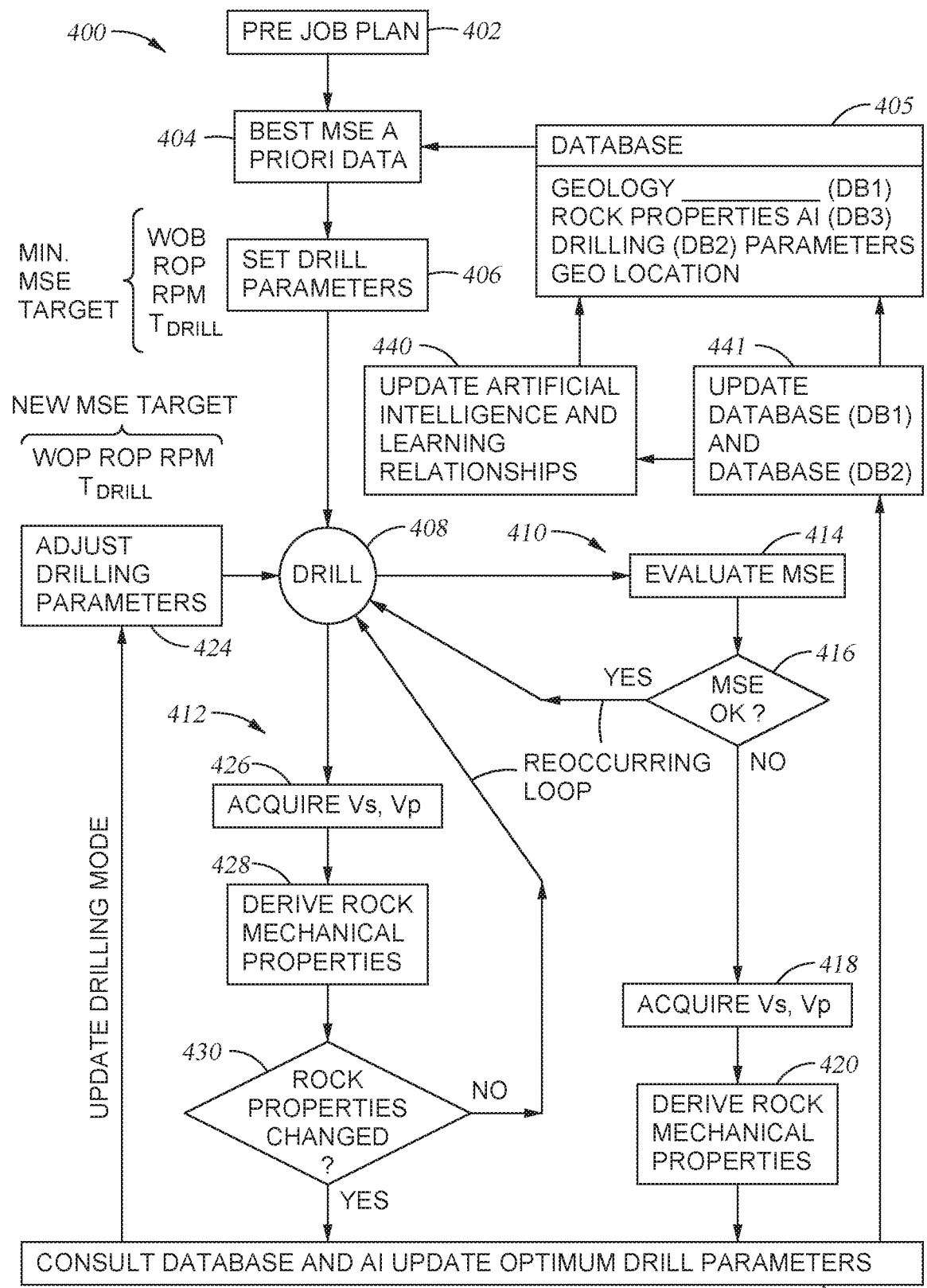
FIG. 4 is a schematic flow chart where example steps of use of the tool of FIG. 1 are depicted.

Shown in FIG. 4 is a flowchart 400 having steps illustrating an example method of drilling. In step 402, the job is preplanned, which in an example includes estimating UCS of the formation being excavated from previously recorded data, such as from an acoustic log from an offset well. In an alternative, based on the estimate of the UCS a target MSE is established that corresponds to the UCS, and drilling parameters are set so the target MSE occurs during drilling. In one example, the coring unit 32 is operating at an optimal MSE when substantially all of the energy applied to the formation 34 from the bit 38 is used up to excavate material from the formation 34, and little to none of the energy applied to the formation 34 from the bit 38 is converted to heat, or pulverizing the formation 34 is excess of what is required for excavating. Optionally, a database is accessed in step 404, that in an example is populated by recording measurements or observations from previous excavating operations. More specifically, in step 404, previously obtained data from knowledge database 405 is accessed in anticipation of operating the coring unit 32 (FIG. 1) at an optimal MSE. In an alternative, historical knowledge is accumulated in knowledge database 405, examples of which include a local or distributed historian database aggregator of various related and associated field coring or drilling operations, as well as operational and multi-generation laboratory simulated test controlled environments. In an embodiment, knowledge database 405 provides historical measurements to enable a priori, and while drilling or coring (real-time and limited delayed) database updates, that when consulted, provide a basis to adjust, plan and operationally and economically optimize the service under multi-objective optimization target and control functions. Sample knowledge database 405 topics include geology, lithology rock properties, and drilling parameters or previous drilling at the same or similar location. Knowledge database 405 is optionally sub-divided in groups DB1, DB2, and DB3. Group DB1 is optionally organized as the conditioning host formation geology, lithology rock properties with corresponding geographic and subsurface location, and group DB2 optionally storing performance solution optimized drilling or coring parameter space (e.g. WOB, ROP, RPM, well path, etc.) corresponding to each entry in the group DB1 data. Further in this example, group DB3 includes Artificial Intelligence (AI) relationships developed with initial knowledge and update inputs (441) with DB1 and DB2 data generating through supervised and unsupervised AI learning relationships producing operational solution targets for optimum drilling and coring parameters.

In step 406 operating parameters of the coring unit 32 are set or adjusted based on one or more estimates of elastic constants of the formation 34 obtained from Equations 1-4 above, and/or the UCS of the formation 34. Example operating parameters include weight on bit ("WOB"), revolutions per minute ("RPM") of the bit, torque applied to the bit, and rate of penetration ("ROP"). Equation 5 below represents a relationship between the MSE and variable operational parameters such as WOB, RPM, and ROP. In an example, a target MSE is established in step 406

$$MSE = WOB/Area + (2\pi \times RPM \times Torque)/(Area \times ROP) \quad \text{Equation 5}$$

In step 408 drilling commences at the drilling parameters selected in step 406. Further illustrated in the example of FIG. 4 are logic loops 410, 412 that represent real time evaluations, and criteria for adjusting operating parameters. Examples exist where logic loops 410, 412 are conducted simultaneously, sequentially, or a combination of simultaneously and sequentially. Included in loop 410 is step 414 that includes estimating the actual MSE of the coring unit 32 while the coring unit 32 is excavating the formation 34. Following step 414 is decision step 416 where the estimated MSE in step 414 is compared with the target MSE of step 406. If a difference between the estimated and target values of MSE from steps 414, 416 is within a designated range, operation of the coring unit 32 continues at its present conditions, and the evaluation and comparison steps 414, 416 also continue at designated time intervals. One example of a designated range of a difference between an estimated and target value of MSE includes values that are up to about 10% of the target MSE, up to about 5% of the target MSE, up to about 1% of the target MSE. If the difference between the estimated and target values of MSE from steps 414, 416 is outside a designated range, the shear and compressional velocities ($V_S$, $V_P$) of the formation 34 are measured in step 418, and in step 420, the shear and compressional velocities ($V_S$, $V_P$) of the formation 34 are used to derive properties of the rock making up the formation 34. In step 422 the database is consulted to identify drilling parameters that correlate to the rock properties derived in step 420. Example data in the database includes unconfined compressive strength and/or Young's Modulus of rock having been excavated, corresponding values of MSE recorded while excavating the rock, and performance results of the excavating, such as but not limited to, rate of penetration, wear on the bit, damage to the bit, and the like. Additional database elements optionally include response of the rock during excavation, such as not limited to, damage to the rock from drilling friction and condition of the cuttings. Drilling parameters are adjusted in step 424 to be in line with the drilling parameters identified in step 422, and drilling continues in step 408 at the adjusted drilling parameters.

Included in loop 412 is step 426 where shear and compressional velocities ($V_S$, $V_P$) of the formation 34 are obtained. Based on the shear and compressional velocities ($V_S$, $V_P$) obtained in step 426, rock properties of the formation 34 are derived in step 428. In step 430, the rock properties most recently obtained/derived ("real time" rock properties) are compared with rock properties obtained or derived just previous to the real time rock properties to obtain a magnitude or magnitudes of rock property change. Example rock properties include UCS and Young's Modulus. If the magnitude or magnitudes or rock property change are within a designated limit, drilling continues as in step 408. If the magnitude or magnitudes of rock property change exceed(s) the designated limit, steps 422 and 424 are repeated as described above. In one embodiment, a designated limit is one that reflects if there is a change in the type of rock or formation type being excavated. Establishing a designated limit of a rock property change is within the capabilities of those skilled in the art. In one example embodiment, a target MSE of the bit is adjusted in real time based on the estimated elastic constants. Optional embodiments of knowledge database 405 include a database 405 update in step 441 based on current measurement observations and drilling performance parameters (step 422), a collection of historical and pseudo real-time relevant observational measurements of groups DB1 and DB2 in main database (step 405) acquired in simulated lab environments or field operational conditions that enable supervised and unsupervised learning optimization techniques (step 420, step 422, step 428, step 430, and step 440) known to the skilled in the art of artificial intelligence. In one embodiment, as operational solution knowledge is increased with more rock properties and classification observations with corresponding drilling performance parameters the database 405 is updated with step 441 enabling the update and improvement of solution learning relationships via artificial intelligence techniques know to the skilled in the art.

Moreover, advantages while drilling downhole are realized by setting or adjusting an operational parameter based on knowledge of downhole rock elastic properties. One example advantage is that armed with elastic constant information about the rock or subterranean formation, the rotational velocity of the coring bit 38 is set or adjusted in accordance with the rock or formation being drilled, and which can reduce wear of the bit 38 and increase its operational life and effectiveness. For example, in a softer formation, the rotational rate of the coring bit can be maintained at levels higher than that when the rock is harder.

Details of the method and system provided in the present disclosure are well adapted to carry out objectives and attain ends and advantages mentioned, as well as others inherent therein. While a presently preferred embodiment of the method and system has been given for purposes of disclosure, numerous changes exist in the details of procedures for accomplishing the desired results. For example, alternatives exist where the techniques described herein are applied to downhole drilling other than obtaining core samples, such as excavating within a borehole. Moreover, alternative sources for acoustic signals are optionally disposed in wellbores adjacent a wellbore where the signals are monitored, on surface, or adjoining formation. In another alternative, transducers $48_{11}$, $48_{12}$, $48_{21}$, $48_{22}$ are fitted with points or spikes (not shown) that engage a wall of the wellbore 14 and physically couple the transducers $48_{11}$, $48_{12}$, $48_{21}$, $48_{22}$ to the formation 34. These and other similar modifications will readily suggest themselves to those skilled in the art, and are intended to be encompassed within the spirit of the present invention disclosed herein and the scope of the appended claims.

What is claimed is:

1. A method of operations in a wellbore comprising:
   contacting a sidewall of the wellbore with a coring bit so that an acoustic signal is generated in a subterranean formation that circumscribes the wellbore;
   obtaining a characteristic of the acoustic signal;
   estimating a first property of the subterranean formation being contacted by the coring bit based on the obtained characteristic of the acoustic signal; and
   operating the coring bit at a designated parameter based on the estimated first property of the subterranean formation;
   wherein the step of contacting comprises radially displacing the bit into impact with the sidewall of the wellbore, conducting coring operations with the bit by rotating the bit, and reciprocating the bit in a plane that is substantially parallel with and spaced radially away from an axis of the wellbore.

2. The method of claim 1, wherein the characteristic of the acoustic signal comprises velocity of a shear wave of the acoustic signal and velocity of a compressional wave of the acoustic signal.

3. The method of claim 1, wherein the property of the subterranean formation comprises a value selected from the group consisting of Young's modulus, Bulk modulus, Shear modulus, Poisson's ratio, and combinations thereof.

4. The method of claim 1, wherein the designated parameter comprises a value selected from the group consisting of a weight on bit and a rotation of the bit per minute.

5. The method of claim 1, wherein the step of reciprocating takes place during a step of obtaining a core sample.

6. The method of claim 1, wherein the characteristic of the acoustic signal is obtained by recording the acoustic signal at a location spaced away from where the sidewall of the wellbore is contacted by the coring bit.

7. The method of claim 1, wherein the characteristic of the acoustic signal being obtained comprises a velocity of the acoustic signal, and wherein the acoustic signal is recorded by acoustic receivers that are spaced apart from one another a known distance and arranged sequentially along an expected path of the acoustic signal.

8. The method of claim 1, wherein the step of contacting a sidewall of the wellbore with a coring bit comprises projecting the coring bit radially from an axis of the wellbore into contact with the sidewall, wherein the characteristic of the acoustic signal comprises a velocity of the acoustic signal, wherein a range of values of a target energy being used per volume of rock drilled is selected based on the estimate of the property of the subterranean formation, and wherein the designated parameter is selected based on the target energy.

9. The method of claim 1, wherein the designated parameter comprises a first designated parameter, the method further comprising changing operation of the coring bit to operate at a second designated parameter in response to a detected change in a second property of the subterranean formation being contacted by the coring bit.

10. A method of operations in a wellbore comprising:
generating an acoustic signal in a subterranean formation that circumscribes the wellbore;
obtaining a characteristic of the acoustic signal; and
excavating in the formation by operating a bit at a designated parameter that is based on the characteristic of the acoustic signal;
wherein the step of excavating comprises radially displacing the bit into impact with the sidewall of the wellbore, conducting coring operations with the bit by rotating the bit, and reciprocating the bit in a plane that is substantially parallel with and spaced radially away from an axis of the wellbore.

11. The method of claim 10, further comprising estimating a property of the subterranean formation being contacted by the bit based on the obtained characteristic of the acoustic signal.

12. The method of claim 10, wherein the characteristic of the acoustic signal comprises velocities of shear and compressional waves in the acoustic signal.

13. The method of claim 10, wherein the step of excavating comprises obtaining a core sample.

14. A system for use in a wellbore comprising:
a coring bit that selectively engages a sidewall of the wellbore;
an acoustic sensor spaced away from the coring bit, and that selectively senses acoustic signals generated by the coring bit engaging the sidewall and that propagate in a formation adjacent the sidewall; and
a processor that is in communication with the acoustic sensor and that selectively estimates a property of the formation based on a characteristic of the sensed acoustic signal, the processor selectively operating the coring bit at a designated parameter based on the estimated property of the formation;
wherein the bit radially impacts the sidewall of the wellbore, rotates, and reciprocates in a plane that is substantially parallel with and spaced radially away from an axis of the wellbore.

15. The system of claim 14, wherein the acoustic sensor comprises an array of sensors, some of which are spaced apart from one another along an expected path of the acoustic signal so that a velocity of the acoustic signal is obtained.

16. The system of claim 14, wherein the acoustic sensor comprises an array of sensors, some of which are spaced axially away from one another, and some of which are spaced laterally away from one another, so that velocities of acoustic signals traveling axially and laterally are obtained by the spaced apart sensors.

17. The system of claim 14, further comprising an actuator for moving the coring bit within a plane that is spaced radially away from an axis of the wellbore.

* * * * *